Patented Nov. 4, 1924.

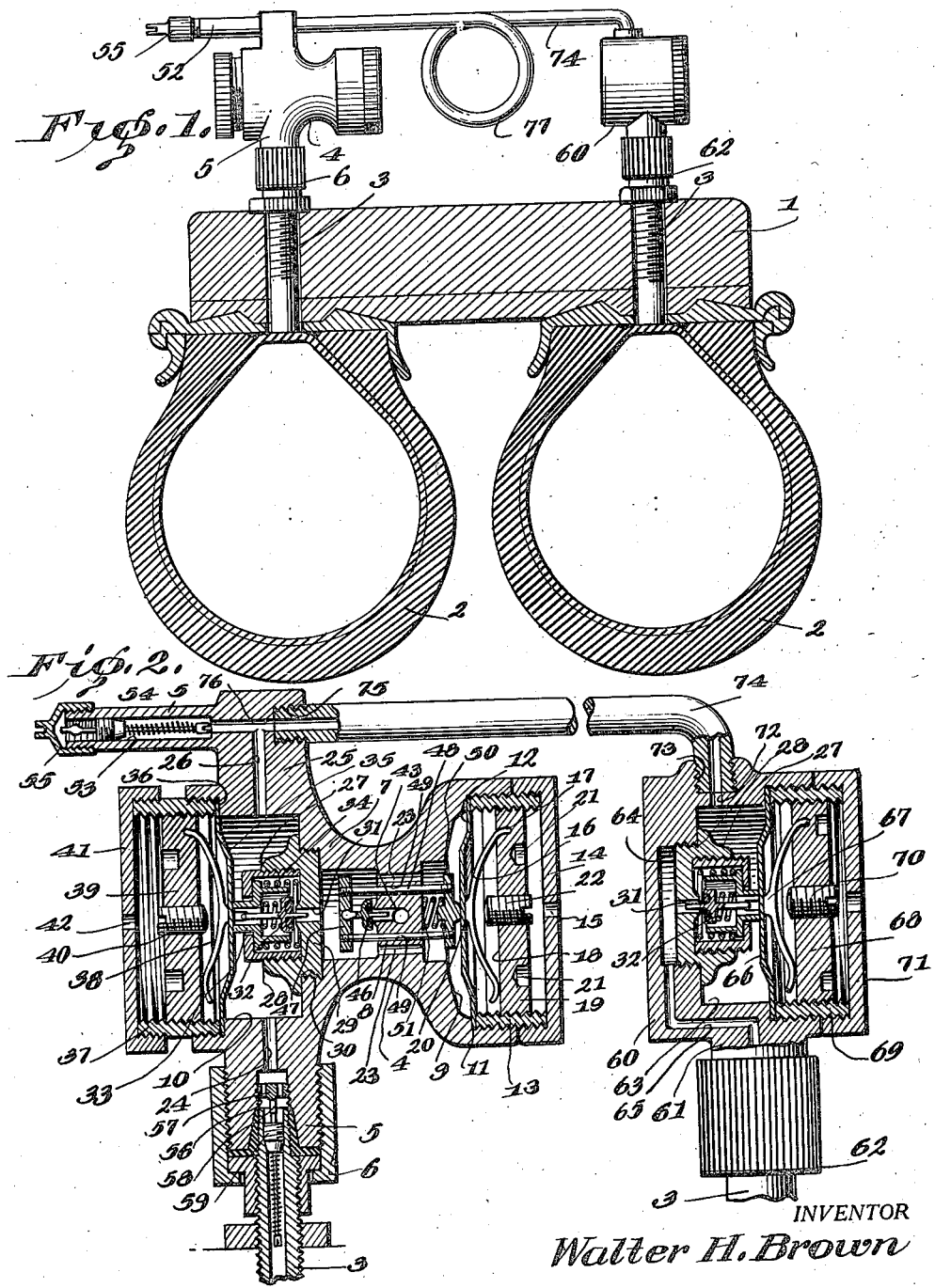

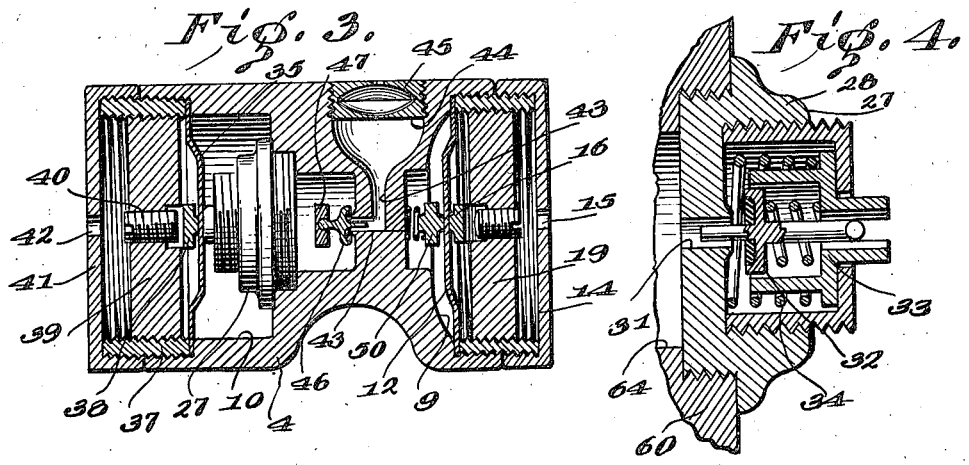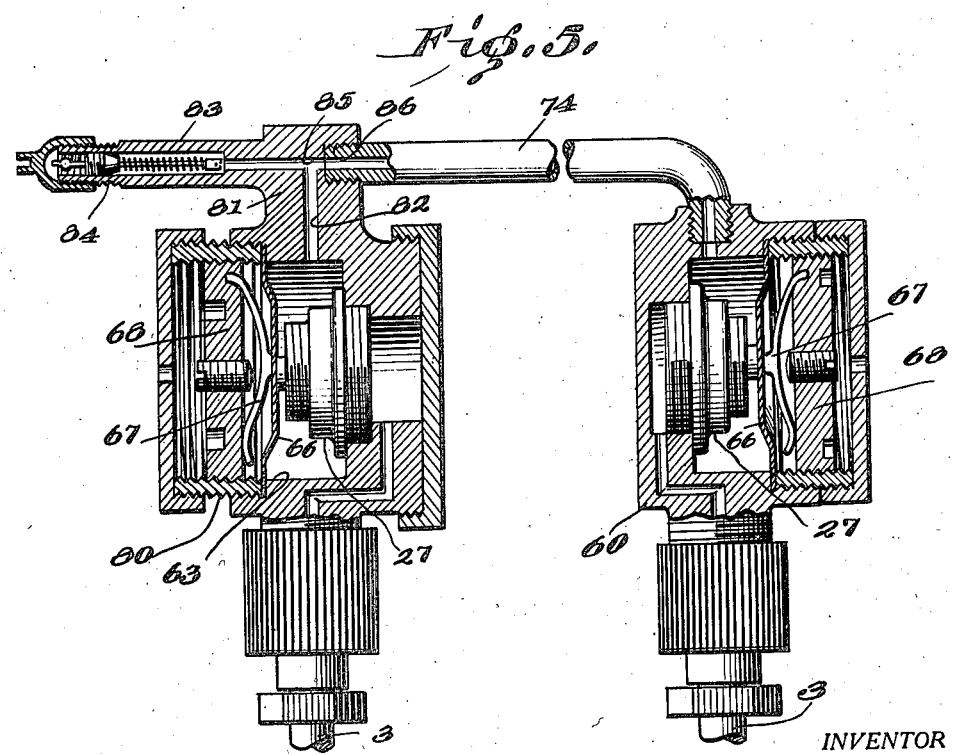

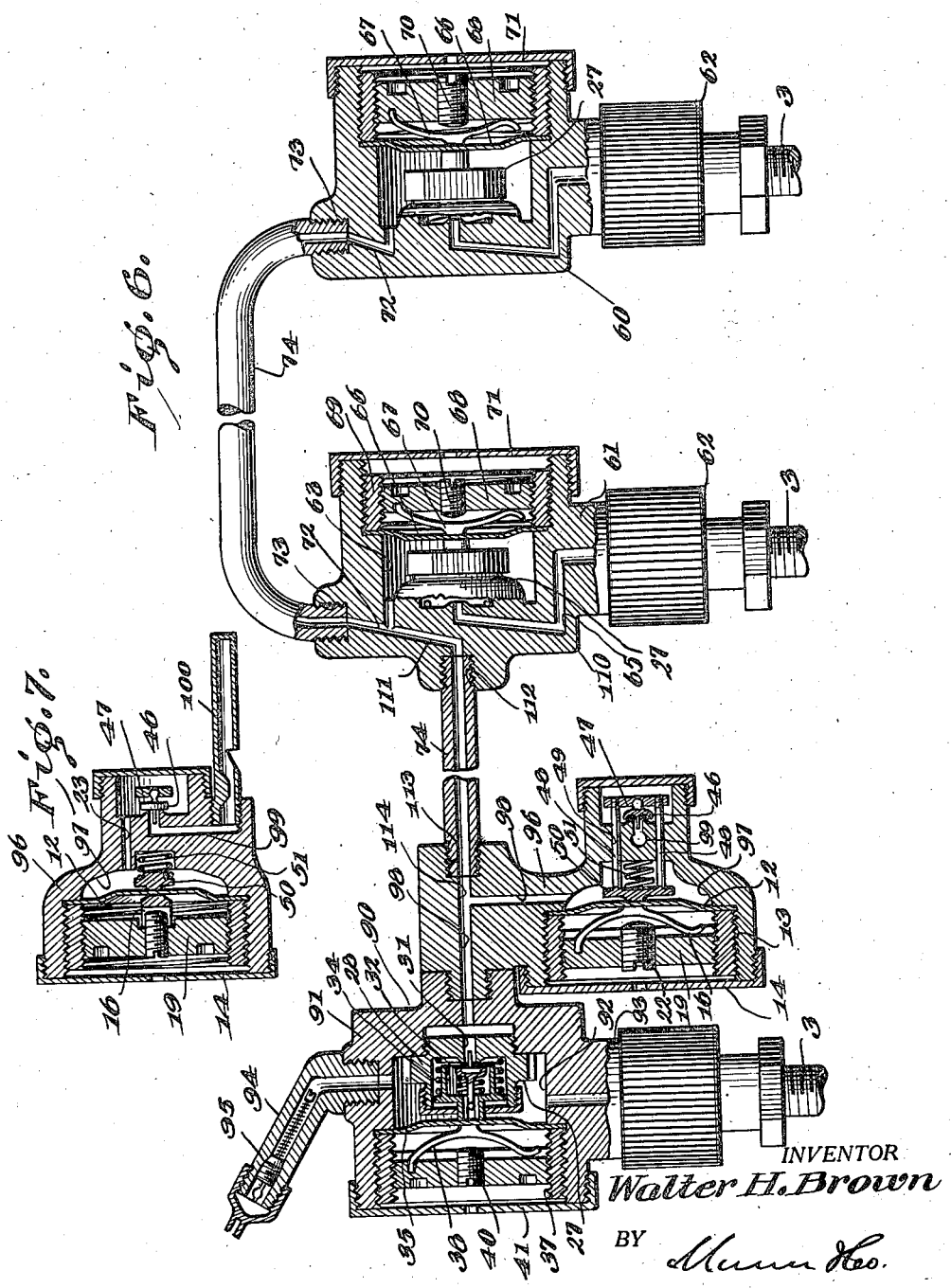

1,513,740

UNITED STATES PATENT OFFICE.

WALTER HENRY BROWN, OF PASADENA, CALIFORNIA.

COMBINED AUTOMATIC AIR-PRESSURE EQUALIZER, LOW-PRESSURE ALARM, AND AUTOMATIC CUT-OFF FOR PLURAL PNEUMATIC TIRES.

Application filed July 13, 1923. Serial No. 651,342.

*To all whom it may concern:*

Be it known that I, WALTER HENRY BROWN, a citizen of the United States, and resident of Pasadena, in the county of Los Angeles and State of California, have invented certain new and useful Improvements in Combined Automatic Air-Pressure Equalizers, Low-Pressure Alarms, and Automatic Cut-Offs for Plural Pneumatic Tires, of which the following is a specification.

My invention is a combined automatic air pressure equalizer, low pressure alarm and automatic cut off for plural pneumatic tires, and it consists in the combinations, constructions and arrangements herein described and claimed.

An object of the invention is to provide a highly efficient means adapted for connection with the tire valve stems of plural tires and affording facilities for equalizing the pressures within the respective tires so long as the average pressure within the tires exceeds a predetermined pressure, for sounding an alarm when the pressure within any one of the tires falls to a pressure which is relatively low but higher than the predetermined pressure and for cutting off communication between the respective tires when the average pressure within the tires does not exceed the predetermined pressure.

A further object of the invention is to provide a device of the character described which is adapted to be applied to the tire valve stems of plural tires mounted on a wheel without any changes in the construction of said tire valve stems, even though the respective tire valve stems be out of alignment transversely of the felloe of the wheel.

Other objects and advantages will be apparent from the following description, considered in conjunction with the accompanying drawings, in which—

Figure 1 is a transverse section through a felloe of a wheel and through dual tires mounted thereon, showing a practical embodiment of the invention operatively applied to the valve stems of the tires, Figure 2 is a relatively enlarged view mainly in section and partly in side elevation, showing the details of construction of the embodiment of the invention, Figure 3 is a longitudinal section through a portion of the structure exhibited in Figure 2, the view being taken at right angles to Figure 2, Figure 4 is a fragmentary sectional view, showing details of another portion of the device, Figure 5 is a view similar to Figure 2, showing a modification, Figure 6 is a view similar to Figures 2 and 5, showing another modification, the latter being adapted for connection with the valve stems of three tires, and Figure 7 is a section through a portion of the structure exhibited in Figure 6, the view being taken at right angles to Figure 6.

Referring now to the drawings and particularly to Figure 1, the numeral 1 designates the felloe of a wheel having dual tires 2 mounted thereon, the valve stems 3 of the tires extending through radial openings in the felloe of the wheel beyond the inner peripheral wall of the latter, as is usual.

In carrying out the invention in the form best seen in Figures 1 and 2, I provide a casing 4 having a lateral tubular extension 5 removably secured at 6 upon the free end portion of one of the tire valve stems 3. The casing 4 comprises a tubular body 7 with which the lateral tubular extension 5 is integral. The tubular body 7 is divided transversely by a partition 8, thus defining chambers 9 and 10 respectively therein. The chamber 9 has an outwardly facing annular shoulder 11 formed in the walls thereof against which a diaphragm 12 is clamped by a diaphragm retaining bushing 13 which is in threaded engagement with the walls of the chamber 9 and which extends beyond the outer end of the chamber 9 for engagement with a cap 14 which closes the chamber 9 at the outer end of the latter. The cap 14 is provided with a vent 15 in the head thereof.

Pressure tending to flex the diaphragm 12 inward for a purpose which will presently appear is applied against the central portion of the diaphragm by an expansion spring 16 which is shown as being semi-elliptical in form and as having one end thereof secured in the socket 17 in the bottom of a diametrical groove 18 in the inner face of a spring carrying plug 19 which is in threaded engagement with the inner wall of the bushing 17. The second end of the semi-elliptical spring 16 is adapted to slide longitudinally of the groove 18 and the spring is provided with a boss 20 which extends from the convexly curved face of the spring intermediate of the length of the latter and bears against the diaphragm. The tension on the spring 16 and consequently the pressure tending to flex the diaphragm 12 inward may be varied by adjusting the plug 19 along the bushing 13. Sockets 21 adapted to be engaged by a wrench are provided in the outer face of the plug 19 for convenience in manipulating it to adjust the tension on the spring. The plug 19 is provided with a central opening threadedly engaged by a screw 22 which extends beyond the inner face of the plug toward the concavely curved face or side of the spring 16 for engaging with the latter to limit the longitudinal expansion thereof.

The chamber 9 is in open communication with the chamber 10 through passages 23 in the partition 8. The bore of the lateral tubular extension 5 designated 24 and is in open communication with the chamber 10. The body 7 also is provided with a second lateral tubular extension 25 having a bore 26 in open communication with the chamber 10.

Communication between either of the bores 24 and 26 and the openings 23 through the partition 8 is controlled by a valve which is designated generally 27, which valve includes a casing 28 provided at its inner end with a head 29 threadedly engaged with a diametrically reduced portion 30 of the walls of the chamber 10. The casing 28 is in open communication at its outer end with the portion of the chamber 10 with which the bores 24 and 26 communicate. The head 29 has an opening 31 therethrough controlled by a valve disk 32 carried by a valve operating member 33 which is slidable in the casing 28 and is held by an expansion spring 34 in position to abut a diaphragm 35 which is held against an outwardly facing shoulder 36 in the inner wall of the chamber 10 by a retaining bushing 37. When the diaphragm 35 is flexed inward in response to the actuation of an expansion spring 38, the valve operating member 33 will be moved inward within the valve casing 28 against the action of the expansion spring 34 to position to permit closing of the valve disk 32 while the expansion spring 34 will function to move the valve operating member 33 outward in the valve casing so that the valve disk 32 cannot move to position to close the opening 31 when the diaphragm 35 has been flexed outward. The specific valve construction 27 is fully described in my prior application for Letters Patent of the United States, Serial No. 636,883 filed May 5th, 1923 for improvement in low pressure alarms and since the specific valve 27 will not be claimed in this application, it is thought that further description of the valve 27 herein is unnecessary.

The expansion spring 38 is identical in construction with the expansion spring 16 and is supported by an adjusting plug 39 which is in threaded engagement with the inner walls of the diaphragm retaining bushing 37. A screw pin 40 in threaded engagement with a central opening in the adjusting plug 39 provides a stop for limiting the expansion of the expansion spring 38. A cap 41 having a vent 42 engages with the projecting outer end portion of the bushing 37 and closes the latter at its outer end. The partition 8 is provided with a passage 43 which extends from the inner face thereof part way through the partition and then radially through the wall of the body 7, being enlarged adjacent to its outer end at 44 as best seen in Figure 3, the enlarged portion 44 being provided with internal screw threads for engagement with a whistle plug 45.

The opening 43 is controlled by a valve 46 which is carried by the head of a yoke 47 having a pair of parallel arms 48 extending slidably through guide openings 49 in the partition 8. The head of the yoke which carries the valve 46 is disposed in the chamber 10 and the arms 48 extend into the chamber 9 toward the diaphragm 12, being connected at their ends proximate to the diaphragm 12 by a cross member 50 which has the central portion thereof bearing against the diaphragm at the approximate center of the latter.

An expansion spring 51 which is arranged between the cross member 50 and the partition 8 urges the cross member away from the partition 8, thereby tending to slide the yoke bodily in such manner as to position the valve 46 in closing relation to the passage 43 at the end of the latter proximate to the valve 27.

The tubular extension 25 has a laterally extending nipple portion 52 having a bore 53 communicating with the bore 25 at the outer end of the latter. The usual Schrader valve 54 is provided for controlling the bore 53 and the nipple portion 52 is adapted for connection at its outer end with any ordinary means for forcing pressure fluid thereinto. A removable cap 55 normally closes the nipple portion at its outer end. The tubular extension 5 has the bore thereof enlarged and threaded at 56 for engagement with a perforated threaded disk 57 having a pin 58 on its outer face adapted to enter the adjacent end of the one tire valve stem 3 and to engage with the Schrader valve 59 in the latter in such manner as to hold the Schrader valve open.

A second casing 60 is provided with a lateral tubular extension 61 secured at 62 to the second of the tire valve stems 3. The casing 60 is fashioned to provide a chamber 63 therein, which chamber is similar to the chamber 10 of the casing 4 and is reduced in diameter adjacent to one end, as indicated at 64. The walls of the reduced portion 64 are threaded internally for engagement with the casing 28 of one of the valves 27. The casing 28 of the valve 27 terminates short of the end wall of the reduced chamber portion 64 so that a space is provided in the latter with which a passage 65 in the wall of the casing 60 and leading to the bore of the lateral tubular extension 61 communicates. Communication between the space within the chamber 64 and the chamber 63 is through the opening 31 of the valve casing 28. The valve disk 32 controlling the latter is permitted to move to closing position when a diaphragm 66 which closes the chamber 63 at its end opposite to the valve casing 28 is flexed toward the latter. An expansion spring 67 which is identical in construction with the expansion spring 38 presses against the diaphragm 66 and tends to flex the latter toward the valve casing 28. The expansion spring 67 is carried by a disk or plug 68 which is in threaded engagement with a diaphragm retaining bushing 69. The disk 68 carries a threaded stop 70 for limiting the expansion of the spring 67 and a vented cap 71 carried by the extending outer end portion of the bushing 69 closes the casing 60 at the end thereof remote from the valve casing 28.

The valve casing 60 is provided with a lateral port 72 enlarged and threaded internally adjacent to its outer end at 73 for engagement with a threaded end portion of a tubular conduit 74. The port 72 is in open communication at its inner end with the chamber 63 and communication between the port 72 and the space within the chamber 64 therefore will be controlled by the valve 27 which is supported within the casing 60 in the manner described. The tubular conduit 74 has the other end thereof threaded for engagement with the internally threaded enlarged portion 75 of a lateral bore 76 extending in the tubular extension 25 of the casing 4 outwardly from the upper end of the bore 26.

From the foregoing description of the various parts of the device, the operation thereof may be readily understood. Let us assume that the tires 2 are deflated. The expansion springs 38 and 67 are alike and the adjusting plugs 39 and 68 are adjusted to impose equal pressures on the diaphragms 35 and 66. The adjusting plug 19 is adjusted so that the pressure against the diaphragm 12 is greater than the pressure against either of the diaphragms 35 or 66. Let us assume for the purpose of illustration that the diaphragms 35 and 66 will yield under the action of the springs 38 and 67 when subjected to a pressure not greater than 80 lbs. per square inch while a pressure of 90 lbs. per square inch is required to flex the diaphragm 12 against the action of the spring 16.

When the tires 2 are in deflated condition, the diaphragms 35, 12 and 66 will be flexed in response to actuation of the springs 38, 16 and 67 respectively and in consequence the valves 27 in the casings 4 and 60 will be closed while the valve 46 in the casing 4 will be opened. Connection having been made between the nipple 52 and a pump or other means for forcing pressure fluid into the nipple 52, it will be obvious that the pressure fluid will pass through the bore 26, chamber 10, bore 24 and one of the tire valve stems 3 into one of the tires 2 and through the tubular conduit 74 and bore 72 into the chamber 63 of the casing 60. The pressure of the fluid forced into the chamber 63 against the diaphragm 66 will cause the latter to be flexed outward against the action of the spring 67, thereby permitting the valve disk 32 of the valve 27 to move to open position and thereafter the pressure fluid entering the chamber 63 will pass along the passage 65 to the second tire valve stem 3 and through the latter to the second tire 2. It of course is to be understood that the tubular extension 61 is provided with the same means as the tubular extension 5 for engaging with the Schrader valve in the second tire valve cap 3 to hold the latter open.

When the pressure within the tires 2 reaches 80 lbs. the diaphragm 35 will be flexed and the valve disk 32 of the valve 27 in the casing 4 will be permitted to move to open position. If pressure fluid is being forced through the nipple 52 from a source of limited supply, as for instance from a hand pump, it may be necessary to close the orifice of the whistle plug 45, as by placing the thumb thereover, until the pressure within the tires has reached 90 lbs. At this time, the diaphragm 12 will be flexed outward against the action of the spring 16 and the valve 46 will be moved to closed position. When the pressure fluid is supplied from a regular service station or other source of relatively great pressure supply, the diaphragm 12 will be flexed almost simultaneously with the diaphragms 35 and 66 and therefore there is no necessity of closing the orifice of the whistle plug. It will be apparent that the valves 27 in the casings 4 and 60 will remain open so long as the pressure in both of the tires 2 does not fall below 80 lbs. The tires 2 will be in communication with each other through the conduit 74 so long as the pressure in both tires does not fall below 80 lbs. per square inch and pressure in the two tires thus will be equalized. Should the pressure in either one of the tires fall below 90 lbs. per square inch for any cause, pressure fluid from the tires will pass through the port 43 and cause sounding of the alarm until the pressure in the tires falls below 80 lbs. per square inch. Pressure fluid from the tires cannot enter the port 43 until the pressure falls to 90 lbs. per square inch for the reason that the valve 46 will be held in closed position until that pressure is reached. Should the lowering of pressure to 80 lbs. per square inch result from the puncturing of only one of the tires 2, the closing of the valve disks 32 will result in the shutting off of communication between the conduit 74 and the tire valve stem with which the casing 60 is associated and therefore the supply of pressure fluid in the uninjured tire will be conserved. This is particularly advantageous in the case of heavy vehicles in service at a considerable distance from an adequate source of pressure fluid supply, since the vehicle is enabled to proceed on the uninjured tire until opportunity is afforded for replacing the punctured tire and for supplying further pressure fluid to the uninjured tire and to the new tire.

The conservation of the pressure fluid in the uninjured tire below a pressure of 80 lbs. per square inch permits the use of a spare tire having an excessive supply of pressure fluid therein since the excess pressure fluid from the spare tire will pass to the uninjured tire when the spare tire has been mounted on the felloe 1 and connected with the uninjured tire in the manner hereinbefore described.

The conduit 74 may be made of a single length of tubular metal or other flexible material bent intermediately to provide a loop, such as indicated at 77 so that the conduit 74 will have sufficient flexibility and will be sufficiently pliable to permit of connection of tire valve stems which are out of alignment transversely of the felloe 1.

In the form of the device exhibited in Figure 5, one of the casings 60 having associated therewith one of the valves 27 and the elements for supporting and operating the valve 27 which have been hereinbefore described is attached to one of the tire valve stems 3. A similar casing having like parts associated therewith is indicated at 80 and is attached to the second tire valve stem 3. Like reference characters have been used to designate corresponding parts of the two casings 60 and 80 and like elements which are associated with these casings. The casing 80 differs from the casing 60 in that it is provided with a lateral tubular extension 81. The bore 82 of the tubular extension is in open communication at its inner end with the chamber 63 of the casing 80 and is in communication at its outer end with the bore of a nipple 83 which is controlled by a Schrader valve 84 and which is adapted for connection with a suitable means for forcing pressure fluid into the nipple. The bore 82 of the tubular extension also is in communication at its outer end with a lateral bore 85 through the walls of the tubular extension, which bore is enlarged and threaded internally at 86 for connection with one of the ends of the conduits 74. The adjusting plugs 68 in the two casings 60 and 80 are adjusted so that the diaphragms 66 therein will be flexed against the action of the springs 67 at a definite pressure, which is the same for both diaphragms. It thus will be apparent that the valves 27 in the two casings 60 and 80 will remain open so long as the pressure within the tires with which these casings are connected exceeds or does not fall below the predetermined pressure and that pressure in the tires therefore will be equalized so long as the predetermined pressure is exceeded. However, should the pressure in either one of the tires fall below a predetermined pressure, the spring 67 will act to permit the valve in the casing connected with that tire to close so that communication between the two tires will be cut off and the pressure fluid in the other tire will be conserved.

In Figure 6, I show a device embodying the invention for connecting the tire valve stems 3 of more than two tires. This modification comprises one of the casings 60 and the parts which have been hereinbefore described as being associated with the casing 60. The casing 60 is attached to the tire valve stem of the tire which is mounted proximate to the inner side edge of the felloe of a wheel. A casing 90 comprises a section 91 having a chamber 92 therein and being provided with a tubular extension 93 which is adapted to be attached to the tire valve stem 3 proximate to the other side edge of the felloe of a wheel. The bore of the tubular extension 93 is in open communication with the chamber 92 which also is in open communication with the bore of a nipple 94 which is adapted for connection with any suitable means for forcing pressure fluid thereinto and which is controlled by a Schrader valve 95. The casing 90 also includes a section 96 having a chamber 97 therein. The section 96 is attached to the section 91 and a bore 98 extends in the walls of the casing sections 91 and 96, being in open communication at one of its ends with the chamber 97 and at its other end with the chamber 92.

The section 91 is provided with one of the valves 27 for controlling communication between the bore 98 and both the bore of the tubular extension 93 and the bore of the nipple 94. The valve 27 is supported within the section 91 in the manner and by elements which have been hereinbefore described and also is associated with elements which have been hereinbefore described for operating the valve. The section 96 is provided with a bore or passage 99 which is in communication at its inner end with the chamber 97 and which is enlarged and threaded internally adjacent to its outer end for engagement with a whistle tube 100. One of the valves 46 and the valve supporting and operating means therefor which have been hereinbefore described are associated with the section 96 for controlling the flow of pressure from the chamber 97 to the whistle tube.

The modification exhibited in Figure 6 also comprises a casing 110 which differs from the casing 60 only in that a bore 111 in communication at its inner end with the bore 72 and opening through the outer wall of the casing is provided. The bore 111 is enlarged adjacent to its outer end at 112, the enlarged portion being provided with internal threads adapted for connection with one of the end portions of the conduit 74. The other end portion of the conduit 74 is engaged with an enlarged portion 113 of a bore 114 in the section 90, the bore 114 being in communication at its inner end with the bore 98. In the embodiment of the invention exhibited in Figure 6, I show only one of the casings 110 and the enlarged portion 73 of the bore 72 therefore is connected by one of the conduits 74 with the enlarged portions 73 of the bore 2 of the casing 60. The casing 110 is provided with one of the valves 27 for controlling communication between the bore 72 and the bore of the tubular extension 61 thereof, the latter of course being attached to one of the tire valve stems 3.

The operation of the form of the device which is exhibited in Figure 6 is identical in essential respects with the operation of the form of the device which is exhibited in Figure 2 and therefore no detailed statement of the operation of the former is deemed necessary herein.

Obviously, my invention is susceptible of embodiment in forms other than those illustrated in the accompanying drawing and I therefore consider as my own all modifications and adaptations of the forms of the device herein described which fairly fall within the scope of the appended claims.

I claim:

1. An attachment for the valve stems of plural tires comprising fluid conducting means attachable to the tire stems to establish communication therebetween, and means controlling communication between the tire stems adapted to act automatically to close communication through said fluid conducting means when the pressure within the tire stems is lowered to a definite pressure.

2. An attachment for the valve stems of plural tires comprising fluid conducting means attachable to the tire stems to establish communication therebetween, adjustable means controlling communication between the tire stems adapted to act automatically to close communication through said fluid conducting means when the pressure within the tire stems is lowered to a predetermined pressure.

3. An attachment for the valve stems of plural tires comprising fluid conducting means attachable to the tire stems to establish communication therebetween, and means controlling communication between the tire stems adapted to act automatically to close communication through said fluid conducting means when the pressure within the tire stems is lowered to a definite pressure, an alarm associated with the fluid conducting means, said alarm being adapted to be actuated by fluid pressure, and means for controlling flow of pressure from the fluid conducting means to the alarm, said last named controlling means preventing flow of fluid to the alarm until the pressure within the fluid conducting means is lowered to a definite pressure higher than the first named definite pressure and then being adapted to act to prevent flow of pressure fluid from the fluid conducting means to the alarm.

4. An attachment for the valve stems of plural tires comprising fluid conducting means attachable to the tire stems to establish communication therebetween, and means controlling communication between the tire stems adapted to act automatically to close communication through said fluid conducting means when the pressure within the tire stems is lowered to a definite pressure, an alarm associated with the fluid conducting means, said alarm being adapted to be actuated by fluid pressure, and means for controlling flow of pressure from the fluid conducting means to the alarm, said last named controlling means being adjustable to vary the action thereof so that flow of pressure fluid from the fluid conducting means to the alarm will be prevented until the pressure in the fluid conducting means is lowered to a predetermined pressure.

5. An attachment for the valve stems of plural tires comprising a casing for each valve stem, said casings being attachable to the respective valve stems and in communication therewith, a flexible conduit connecting each two adjacent casings and establishing communication between said adjacent conduits, a valve in each casing for controlling the flow of pressure fluid from the tire valve stem with which the casing is associated to the conduit with which the casing is connected, diaphragm controlled means for moving the valve to open position, said diaphragm being adapted to be actuated by fluid pressure from the tire valve stem with which diaphragm is associated, and a spring for moving the valve to closed position against the action of the diaphragm.

6. An attachment for the valve stems of plural tires comprising a casing for each valve stem, said casings being attachable to the respective valve stems and in communication therewith, a flexible conduit connecting each two adjacent casings and establishing communication between said adjacent conduits, a valve in each casing for controlling the flow of pressure fluid from the tire valve stem with which the casing is associated to the conduit with which the casing is connected, diaphragm controlled means for moving the valve to open position, said diaphragm being adapted to be actuated by fluid pressure from the tire valve stem with which diaphragm is associated, a spring for moving the valve to closed position against the action of the diaphragm, and means for varying the tension on the spring.

7. An attachment for the valve stems of plural tires comprising a casing for each valve stem, said casings being attachable to the respective valve stems and in communication therewith, a flexible conduit connecting each two adjacent casings and establishing communication between said adjacent conduits, a valve in each casing for controlling the flow of pressure fluid from the tire valve stem with which the casing is associated to the conduit with which the casing is connected, diaphragm controlled means for moving the valve to open position, said diaphragm being adapted to be actuated by fluid pressure from the tire valve stem with which diaphragm is associated, a spring for moving the valve to closed position against the action of the diaphragm, an alarm associated with one of said casings and adapted to be actuated by pressure from the casing, a valve for controlling flow of pressure from said one casing to the alarm, a diaphragm subjected to pressure from the said one casing and adapted to move the last named valve to closed position, and a spring resisting the action of said diaphragm and adapted to move the valve to open position when the pressure within the said one casing has been lowered to a definite pressure.

WALTER HENRY BROWN.